(12) United States Patent
Smith et al.

(10) Patent No.: US 7,818,206 B2
(45) Date of Patent: Oct. 19, 2010

(54) SYSTEM AND METHOD FOR PROFILING DIFFERENT USERS HAVING A COMMON COMPUTER IDENTIFIER

(75) Inventors: Tucker L. Smith, Irmo, SC (US); James L. Browning, Columbia, SC (US)

(73) Assignee: Teradata US, Inc., Miamisburg, OH (US)

( * ) Notice: Subject to any disclaimer, the term of this patent is extended or adjusted under 35 U.S.C. 154(b) by 2101 days.

(21) Appl. No.: 10/008,259

(22) Filed: Oct. 29, 2001

(65) Prior Publication Data
US 2003/0083938 A1    May 1, 2003

(51) Int. Cl.
*G06Q 30/00*    (2006.01)
(52) U.S. Cl. ..................................... 705/14.1
(58) Field of Classification Search .................. 705/14, 705/14.1
See application file for complete search history.

(56) References Cited
U.S. PATENT DOCUMENTS

| 5,758,257 | A | * | 5/1998 | Herz et al. ................... 725/116 |
| 5,848,396 | A | | 12/1998 | Gerace |
| 5,991,735 | A | | 11/1999 | Gerace |
| 6,021,439 | A | | 2/2000 | Turek et al. |
| 6,128,624 | A | | 10/2000 | Papierniak et al. |
| 6,134,532 | A | | 10/2000 | Lazarus et al. |
| 6,151,584 | A | | 11/2000 | Papierniak et al. |
| 6,151,601 | A | | 11/2000 | Papierniak et al. |
| 6,182,133 | B1 | | 1/2001 | Horvitz |
| 2001/0049620 | A1 | * | 12/2001 | Blasko ......................... 705/10 |

* cited by examiner

Primary Examiner—Daniel Lastra
(74) Attorney, Agent, or Firm—Maginot, Moore & Beck (57) ABSTRACT

A system and method profiles different users having a common terminal identifier in communication system. The system comprises a user activity data analyzer for extracting profile data from user terminal activity data, a user identifier for determining whether the profile data corresponds to a profile data history associated with the user terminal, and a user profile generator for generating a profile data history from the profile data for another user to be associated with the terminal in response to the profile data not corresponding to the profile data history associated with the user terminal. The user activity data analyzer extracts site addresses, URLs, click event data, metadata and other user activity from a session log to compile information useful for assessing a user's interests. This extracted profile data may then be compared to a profile history previously generated and associated with the terminal identifier. A low level of correspondence between the extracted profile data and the profile history associated with the terminal identifier indicates that a different user is generating the user activity data. The user profile generator then builds a profile history from the extracted profile data and associates it with the terminal identifier. The profile histories are provided different user identifiers. Upon subsequent detection of the terminal identifier, the profile data extracted from the user activity is compared to both profile histories to determine which user is navigating the site. Once sufficient profile data has been extracted to determine which profile history corresponds to the extracted data, advertising content that corresponds to the identified user may be selected and included in the content requested by the current user.

24 Claims, 3 Drawing Sheets

SYSTEM AND METHOD FOR PROFILING DIFFERENT USERS HAVING A COMMON COMPUTER IDENTIFIER

FIELD OF THE INVENTION

This invention relates generally to methods and systems for tracking user activity at a terminal on a communication network and, more particularly, to methods and systems for generating user profiles based on user activity a communication terminal.

BACKGROUND OF THE INVENTION

The Internet is a well-known computer network that supports the interaction of literally millions of computers. Most of these computers communicate through a client/server scheme although the peer-to-peer communication model is used as well. Although the Internet was originally envisioned for the purpose of facilitating the dissemination of information between geographically divergent locations, many have tried to exploit the electronic commerce capability of this network. Few companies, however, have succeeded in establishing commercial viability through revenue generated from sales occurring in Internet electronic transactions alone. Consequently, others have attempted to find a commercial opportunity in the prolific communication traffic that occurs over the Internet for the purposes of information acquisition and dissemination.

Many Western nations are mass consumer markets and vendors vie for the attention of consumers in order to interest them in their products and/or services. Advertising has moved into every media form as it has arisen, particularly in Western nations, to present products and services to potential consumers in an effort to influence their buying decisions. Advertising agencies and vendors spend significant amounts of resources to learn the attributes that identify those consumers most likely to purchase particular goods and services so the advertising can be placed in the media viewed most often these consumers.

This targeting of consumers having a high degree of likelihood in purchasing a company's products or services is very important. As the agencies and companies expend significant resources to develop advertising for various media, they want to present them where they are most likely to be effective. For example, car manufacturers do not buy television broadcast time for children's programs and cartoons because the viewers of these shows are not consumers of automobiles. However, cereal manufacturers do purchase this broadcast time because these viewers do influence the buying decisions for breakfast cereals that are made by their parents. Thus, those persons responsible for buying access to media venues are very interested in the persons who view the various media venues.

The problem with the Internet and indeed any communication network where people are able to view a media anonymously is that little or no knowledge about the demographics of the viewers is known. One particularly frustrating aspect of computer network communication is the inability to identify the computers accessing a server or peer over the network. For example, most users access the Internet through an Internet Service Provider (ISP). In this communication scheme, a user couples to an ISP's communication hub by communicating messages and files through a modem over an analog or digital telephone line. From the ISP's hub, the messages and files may be routed internally through the ISP's intranet to servers or peers that are subscribers to the ISPs services or the messages and files may be routed to the external Internet routers for delivery to servers or peers that are not ISP subscribers. In the message formats for the files and messages, a user's computer includes an Internet Protocol (IP) address to identify the user's computer. However, the ISP typically assigns a different IP address to a computer each time a user accesses the ISP hub and the ISP may change the IP address before sending a message or file out to the external Internet in an effort to cloak the identity of the user's computer. Likewise, computers known as firewalls and secure routers may also alter an IP address for external communications to frustrate efforts to compromise the integrity of a user's computer.

In an effort to pierce this level of anonymity, some sites utilize the cookie field of Transport Control Protocol/Internet Protocol (TCP/IP) messages. "Cookies," as they have come to be commonly known, are identifiers assigned by a server or peer and placed in reply messages to another computer. Browsers, the application programs for communicating over computer communication networks, particularly those using Hyper Text Transport Protocol (HTTP) for Hyper Text Markup Language (HTML) documents, use the cookie for subsequent messages to the site that assigned the cookie. At the conclusion of a communication session with a site, the communication program, such as a browser, stores the site address and cookie in a file on the user's computer. If the user accesses the site during another subsequent browsing period, the browser determines that the site has been previously accessed by the user and inserts the stored cookie into the messages with the site. If the computer at the site has stored the cookies that it has previously assigned, it can detect the return of a computer that has previously visited. If any information was stored regarding the last time the computer identified by the cookie communicated with the site, then it can be retrieved and used. For example, if the user registered with the site by providing a user name and other user data during the previous visit, then, using the cookie as a key, the site computer can retrieve this data and welcome the user by name without requiring the user to login.

If users were willing to register on computer sites then advertisers would be able to learn more about the people who visit computer sites. Unfortunately, most users are resistant to providing personal information. Consequently, a site computer may be able to detect the occurrence of another communication session with a computer to which a cookie was previously assigned but little or no information about the user can be ascertained. Not until the user provides personal data in response to a request to complete an information form or performs some transaction that accurately identifies the user will the site be able to obtain demographic data on the user. Once a user's name and/or address can be obtained then personal information databases may be mined to obtain demographic data to further identify the user's interests and attributes.

Operators of Web sites or other computer sites on computer networks have attempted to exploit the potential of advertising to the users who view content delivered from a site. Site operators try to attract advertisers and vendors by touting the number of "clicks" or "hits" registered at their site. They promote the advertising potential of the site by offering to run banner ads in their site content. Advertisers evaluate the advertising effectiveness of a site by examining the amount of communication traffic at a site and the content of the site. Some content is more desirable to a particular age group, gender, or income level and, if that age group, gender, or income level is not an important consumer of the advertiser's goods and services, advertising at the site is not a good investment.

At least two problems make this evaluation difficult. For one, some sites act as portals to a variety of content. Consequently, advertisers have a difficult time in assessing the content that is being most frequently viewed by users. Although a portal may have content that would attract new car buyers and after market car accessory buyers, if most of the hits demonstrate new car buyer visits then an after market accessory manufacturer would not do well in advertising at the site. To address this problem, systems have been developed that record and store session logs of a user's activity with a site. These systems typically record the Universal Resource Locators (URL) that a user requests for viewing at a user's computer. Using this information, a cookie may be associated with a session log and the content contained in the URLs of the log. An analysis of the most frequently requested logs may be performed to identify the most frequently obtained content from the site to assist in the identification of the users attracted by the site.

The second problem for advertisers is information regarding the users. While a site operator may have suppositions regarding the identity of a user accessing the site, the fact remains that all the site really knows is that a cookie identifier has been associated with a list of URLs accessed by the cookie-identified computer. However, there is rarely a one-to-one correspondence between a computer and a user. Many families use a common computer for all family members to access the Internet. Thus, when different family members use the computer during different browse periods to access the same site, a program at the site analyzing the user activity associates the activity with a single user. This assumption blurs the demographic distinctions that may be ascertained from the content previously viewed through the computer. If banner ads are selected based on this prior user activity then ads having little or no interest to the current user will be displayed. Because hits on banner ads are an important statistic for attracting advertisers to a site, a site operator wants to place ads before a viewer that are likely to result in a hit. Analyzing user activity from a single computer as if a single user generated it reduces the likelihood of accurately identifying the user during a session.

What is needed is a method of analyzing user activity associated with a cookie that differentiates between users of a computer.

What is needed is a system that recognizes different users of a single computer and selects appropriate advertising for the recognized user.

SUMMARY OF THE INVENTION

The above-noted limitations of previously known systems and methods for analyzing user activity associated with a computer have been overcome by a system and method that operate in accordance with the principles of the present invention. The system for profiling different users having a common terminal identifier comprises a user activity data analyzer for extracting profile data from user terminal activity data, a user identifier for determining whether the profile data corresponds to a profile data history associated with the user terminal, and a user profile generator for generating a profile data history from the profile data for another user to be associated with the terminal in response to the profile data not corresponding to the profile data history associated with the user terminal. The user activity data analyzer extracts site addresses, URLs, click event data, metadata and other user activity from a session log to compile information useful for assessing a user's interests. This extracted profile data may then be compared to a profile history previously generated and associated with the terminal identifier. A low level of correspondence between the extracted profile data and the profile history associated with the terminal identifier indicates that a different user is generating the user activity data. The user profile generator then builds a profile history from the extracted profile data and associates it with the terminal identifier. The profile histories are provided different user identifiers. Upon subsequent detection of the terminal identifier, the profile data extracted from the user activity is compared to both profile histories to determine which user is navigating the site. Once sufficient profile data has been extracted to determine which profile history corresponds to the extracted data, advertising content that corresponds to the identified user may be selected and included in the content requested by the current user.

The system of the present invention may be implemented at a content communication site, such as a Web site, or at a content communication hub, such as an ISP hub. At a content communication site, the system analyzes session logs associated with a terminal identifier, such as a cookie. At a communication hub, the system may analyze a browse period log and the terminal identifier may be a cookie or an IP address. A browse period log is a database of user activity beginning with the initial access of the ISP hub and the user's logout from the ISP hub. Within this browse period are the session logs containing the user activity data that has occurred between a user and the various content communication sites visited by the user during the browse period. At the communication hub, therefore, the system of the present invention may obtain a wider range of profile data than is available at a content communication site alone. This additional information is useful in identifying the interests of each user of a computer. Also, the IP addresses and information available to the ISP hub through its support software located on a terminal may be useful in further identifying the computer and user driving a browse period. For example, a laptop identified by the support software may indicate which family member is driving a browse period and that person's identity may be used to supplement the data in the profile history. The stationary model used in the family house may indicate other users and help differentiate those users and their profiles from the laptop user even though they all access the computer through the same ISP account.

The system of the present invention may be particularly useful in cable television networks (CATV). To support view on demand and other user selection services, CATV networks are providing channels for receiving communication from subscriber sites. These channels may be used by the processors in set top boxes to send data regarding the broadcast channel being viewed on a television set at a subscriber site. Messages indicating the power on and power off status of a television set may be used to identify browse periods and data regarding duration of view for each channel displayed may be evaluated as session data. These data may be analyzed to develop a parent profile, a husband profile, a wife profile, and group and individual child profiles for the viewers at a subscriber site. Comparing the extracted profile data to the profile histories associated with a subscriber identifier, the system at the head end of the CATV network may be able to identify the viewer or viewer group at different television sets at a subscriber site. The system may then select different advertising content to be delivered to the different sets operating at the subscriber site. The ads or interest content may be displayed at a set as a scroll window along a border of the screen or as a window within screen display.

The method of the present invention comprises extracting profile data from user terminal activity data, determining whether the profile data corresponds to a profile data history associated with the user terminal, and generating a profile data history from the profile data for another user to be associated with the terminal in response to the profile data not corresponding to the profile data history associated with the user terminal. The method may be performed at a content communication site or a communication hub in a communication network. The terminals may be computers identified by cookies or IP addresses or they may be television sets located at subscriber sites and further identified by data from set top processors. The method permits the different users and viewers of the terminals to be detected and associated with profile histories for the terminals. This data may also be used to better target advertising and further enhance the advertising potential of a communication content site, an ISP service, or a CATV system.

It is an object of the present invention to differentiate users and viewers at terminals in a communication system without requiring registration information.

It is an object of the present invention to identify a user during a session for purposes of targeting advertising to the user.

It is an object of the present invention to build a user profile during a session in response to extracted profile data having a low degree of correspondence with existing profile histories associated with a terminal.

It is an object of the present invention to mine session and browse period data to detect different users of a terminal.

One advantage of the present invention is the ability to profile more users from hits at a content communication site to improve the advertising potential of the site.

Another advantage of the present invention is the ability to more accurately profile users from hits at a content communication site.

Another advantage of the present invention is the ability to differentiate users or groups of users who access a content communication site through a secure access device such as a firewall.

These and other objects, advantages and features of the present invention may be discerned from reviewing the accompanying drawings and the detailed description of the invention. dr

BRIEF DESCRIPTION OF THE DRAWINGS

The present invention may take form in various system and method components and arrangement of system and method components. The drawings are only for purposes of illustrating an exemplary embodiment and are not to be construed as limiting the invention.

DETAILED DESCRIPTION OF THE INVENTION

Figure 1:
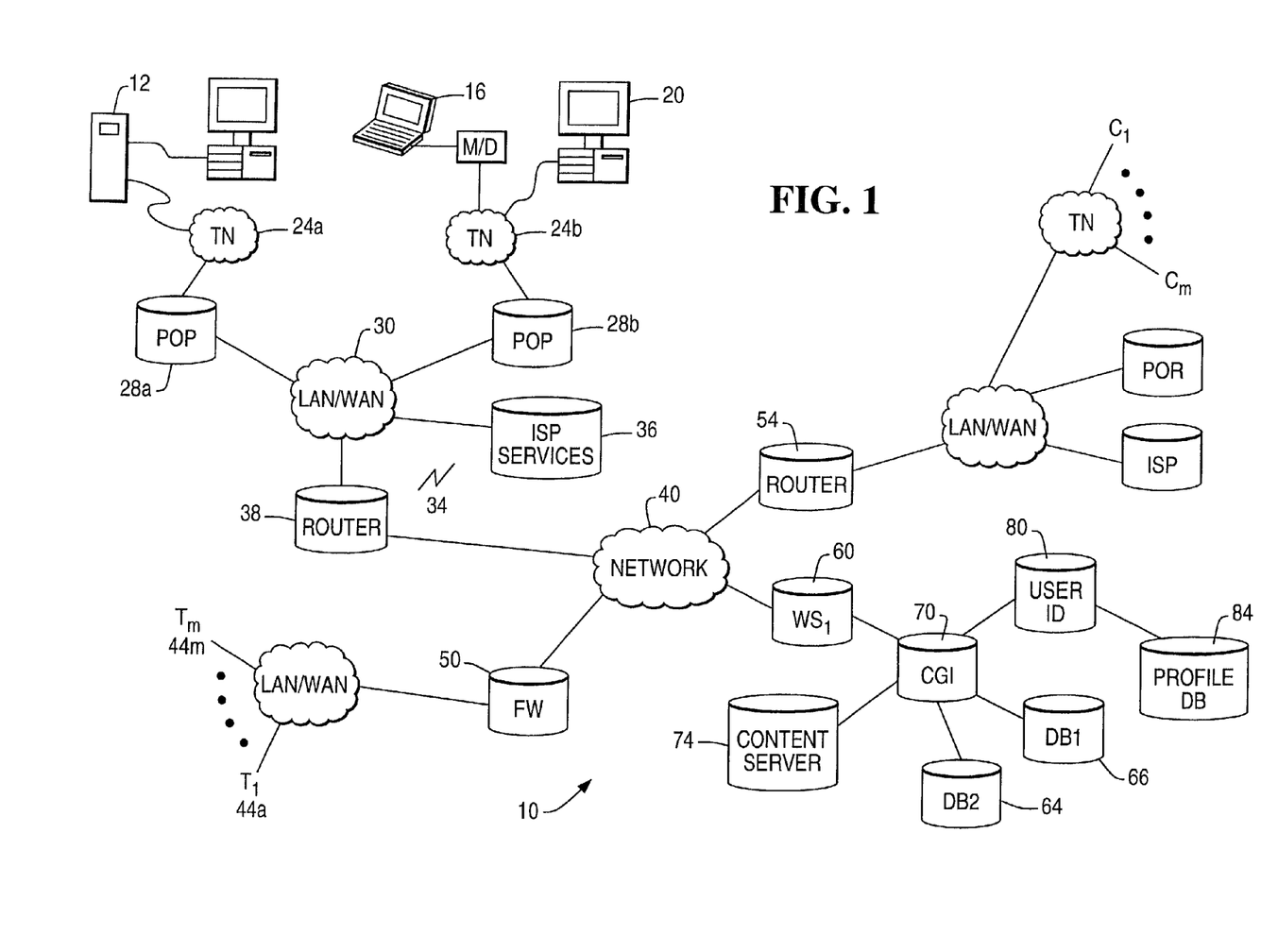
FIG. 1 depicts a diagram of communication network in which the present invention may be used.

A system in which the system and method of the present invention may be used is shown in FIG. 1. System 10 includes client computers 12, 16, and 20 that are coupled through telephone networks 24a and 24b and Point-of-Presence (POP) servers 28a and 28b to the local area network (LAN) or wide area network (WAN) 30 of an Internet Service Provider (ISP) 34. ISP 34 is coupled through a router 38 to a wide area network commonly known as the Internet and designated with the numeral 40 in the figure. By way of example, system 10 also includes terminals 44a-44m of a LAN/WAN 48 that are coupled to network 40 through a firewall or other known secure server 50. Terminals 44a-44m may also act as clients in system 10. Numeral 54 designates another ISP network that couples client computers C1-Cm to Internet 40. Web server 60 is coupled to network 40 to provide access to content stored in database servers 64 and 66 through Computer Gateway Interface (CGI) 70. CGI 70 is also coupled to a content server 74. Also coupled to CGI 70 is a user differentiating system 80 that includes a user profile database 84.

In more detail, client computers 12, 16, 20, C1-Cm, and terminals T1-Tm may be any conventional known personal computers, work stations, desktop, portable, handheld, set top, personal digital assistants, or wireless communication devices that may couple through an ISP, other service provider or communication hub to any wide area or local area network such as the Internet or an intranet. These devices typically include a processor, storage, programmed instruction for operating the device and a display. The examples shown in FIG. 1 may use a modem or network interface device to couple to a communication network such as a telephone or satellite network. Messages to and from the client devices may then be provided to an ISP or other service provider network. The ISP usually provides subscriber support services through one or more service servers 36 such as email services, search engines, and other known services. Subscriber service providers include ISP companies, commerce service providers (CSP), cellular and other wireless service providers who couple wireless communication devices to communication networks such as the Internet or intranet communication networks. These various service providers couple users through computers and other communication devices to a communication network for the purpose of exchanging information requests and the documents and files responsive to those requests.

Content for these information requests may come from other client users or from content communication sites such as Web server 60. Web servers typically establish and manage a session with a user. The requests for data and reply messages from a client device are typically provided to another computer for processing such as CGI 70. CGI 70 typically executes script programs to locate resources for transmission to the requesting clients from databases located in proximity to CGI 70 such as databases 64 and 66 or from remote databases. These resources are typically identified by Universal Resource Locators (URL) that are included in the request and reply messages from client devices.

In establishing the communication session with a client device, Web server 60 typically searches a data field in the request or reply for cookie data. Cookie data is identifying data placed in a message returned to a client device by a Web server. The communication application program in a client is commonly known as a browser. Browsers support communication over a communication network through a service provider in a variety of protocols. Although the HTTP protocol and documents in the HTML language/format are the ones most commonly used in many communication networks, other protocols and language/formats are typically supported. Most known browsers store in the client device the cookie data that is assigned by a server at a content communication site to the client device and insert the cookie data into data requests for subsequent communication sessions with the content communication site. In this manner, most servers at content communication sites may identify client devices communicating with them that have previously visited the site.

In previously known systems, systems for generating user profiles used the cookie data to recognize a client device that has subsequent communication sessions with the content communication site. These systems collect the user activity data such as length and time of a session, resources accessed in a session, a log of the mouse events occurring at the user client device, and transaction data entered by the user at the site. This data may be obtained by monitoring the messages returned to the site from the client device or the site may embed or otherwise download an application program with a document sent to the client device that executes on the client device and collects user activity. This user activity data may then be returned to the system at the site for data analysis and user profile generation. For example, a data object or a Java applet may be downloaded for user activity data collection purposes. If the user accepts a plug and play activity monitor, the application program for collecting user activity data may not only collect data but store the data on the user's storage drives and monitor user activity data at other content communication sites. This stored data may then be returned to the content communication site that downloaded the plug and play component. User activity components may also be part of the browser application program to obtain the same advantages as the plug and play modules. Regardless of the collection method, these previously known systems have evaluated the collected data as if they were generated by only one user. These systems perform Bayesian model analysis such as general Bayesian networks, hidden Markov models, and decision trees derived from Bayesian networks. Other statistical and probabilistic models are known and used to analyze the user activity data to construct a user profile for a single user. The limitation of these previously known systems is that they do not evaluate the user activity data to determine whether the user activity comports with a user profile associated with the client device. Thus, the analysis done on the user activity is used to alter the user profile history and that affects its accuracy. Only if the user has previously provided registration data, such as a user name, account number or other specific user identifying data, are these previously known systems able to determine that a user activity corresponds to a user other than one for which a profile history has been previously generated. The system and method of the present invention overcomes this limitation of previously known systems.

User identifying system 80 of FIG. 1 is shown as a separate system coupled to CGI 70 and Web server 60 although such depiction is illustrative only. System 80 may be incorporated within a web server or CGI or distributed over one or more computers at a content communication site. Additionally, system 80 may be coupled to the ISP service server 36 or incorporated in such a server at the ISP site to collect and analyze user activity from subscriber sites to differentiate between users at the same site. When located at the ISP site or a content communication site, system 80 may be used to identify which user is operating a client device during a session or browse period and the user's profile history may be provided to a content server for purposes of providing targeted marketing to the user. Thus, a content server 74 may be provided at either or both ISP sites for communication with a system 80 at the site to provide targeted content such as advertising to the subscribers of the ISP or to external users accessing publicly available documents from the ISP. System 80 may also be provided at any of the clients in FIG. 1. The user activity data extractor and analyzer may be program components or data objects that are downloaded from a content communication site, a program component of the browser application, or a plug and play or other application program that preferably executes and communicates with the browser during network communication sessions. Of course, such an implementation only extracts data and develops profiles for the users who access the computer on which system 80 executes but this data may be downloaded to a content server coupled to the communication network during browse periods. The content server may then select targeted content such as marketing documents for transmission to the client device.

As shown in FIG. 1, system 80 is coupled to a profile history database 84 for storage of user profile histories. Database 84 may be a relational database that is managed directly by system 80 or by a relational database management system (RDBMS). Database 84 may also be an object repository or other known managed data storage scheme. If memory or storage space on the components of system 80 permits, database 84 may be incorporated in system 80 or one of the other computers at the site where system 80 operates. By way of example, system 80 may be comprised of a Pentium II processor having sufficient RAM and hard disk storage, such as 64M of RAM and 20 GB hard drive. A read/write CD ROM drive may also be utilized for storage requirements. The operating system for system 80 may be any known operating system such as Macintosh O/S, OS/2, AIX, BE OS, one of the Windows operating systems, LINUX, UNIX, or the like. Communication between the computers at the site where system 80 is located may be performed through any known network method such as TCP/IP or other known Internet, intranet, LAN, or WAN implementation of a network protocol. The hardware specification for the communication may be via Ethernet (IEEE 802.3), Token Ring (IEEE 802.5), Fiber Distributed Datalink Interface (FDDI), or Asynchronous Transfer Mode (ATM).

Figure 2:
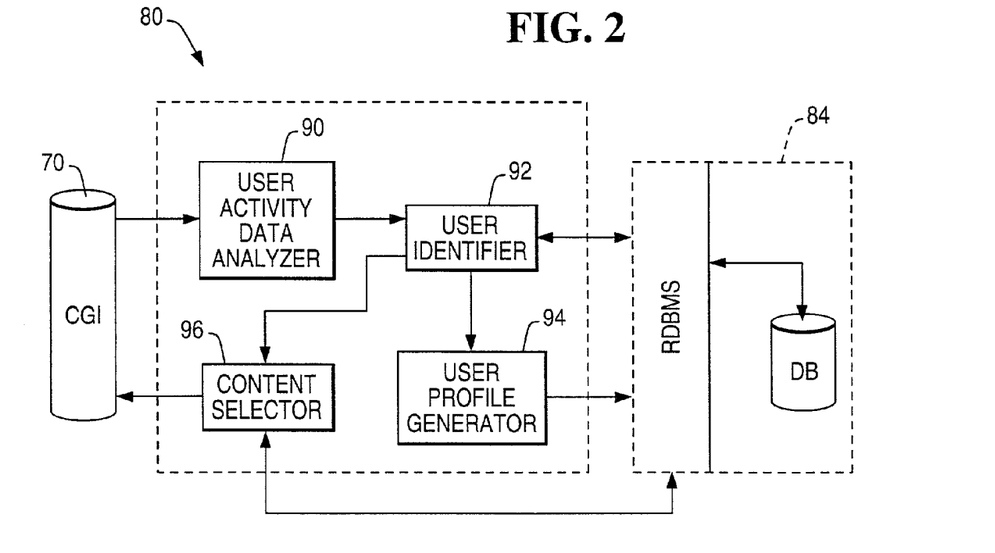
FIG. 2 is a block diagram of an exemplary embodiment of a system for differentiating users at a terminal that is shown in FIG. 1.

An exemplary embodiment of system 80 is shown in more detail in FIG. 2. The system includes a user activity data analyzer 90, a user identifier 92, a user profile generator 94, and a content selector 96. User activity data analyzer 90 may receive user terminal activity data from web server 60 or CGI 70. The user terminal activity data may be requests and returned forms received from a client or these data may include data captured at a client by a plug-and-play module, an application program component, or a downloaded object or other program. These data are analyzed by analyzer 90 to extract profile data such as identifiers for requested resources, personal data from returned forms such as campaign responses, terminal identifiers such as cookie data and IP addresses, site identifiers such as web site addresses, metadata, identifiers for pages and other resources browsed by the user, identifiers for data objects clicked by the user, items purchased by the user, and such other data that may be used to identify preferences of a user. These data are provided to user identifier 92 and identifier 92 searches the profile data to locate keys, indices, or the like that are used to store profiles in profile database 84. The key data are data that identifies the terminal or account from or through which a user accesses a communication network to which system 80 is coupled. Such data may include cookie data, an IP address, a subscriber identifier, or the like. If no keys are identified or if no profiles are stored in database 84 in associated with an identified key, user profile generator 94 generates a new user profile from the extracted user profile data. The determination regarding the existence of a user profile in database 84 is performed in two stages. In the first stage, any located key in the profile data is used to search database 84 for an existing profile. If it is not located, then the user identified by the cookie data, IP address, or the like does not have a profile stored in database 84. In response, profile generator 94 generates a profile from the extracted profile data that identifies preferences of the user as determined from the profile data. Additionally, profile generator 94 may query other databases using personal information recovered from the profile data for other data such as demographic data. This additional data may also be included in the profile associated with a key, index, or the like that is used to stored the profile in database 84. The second stage occurs when a profile is located that corresponds to a key contained in the profile data. The preference data stored in the profile is compared in the extracted profile data to determine the degree of correlation between the two data sets. If the correlation degree exceeds a threshold, the extracted profile data is used to update the existing profile. If the correlation does not exceed the threshold, an additional user is provisionally detected for the key. In this event, user profile generator 94 generates a new profile and generates a key that further provides a user identifier as well as a computer identifier for storage of the profile. The key for the existing profile is likewise modified so that subsequent searches of database 84 with the computer identifier, such as cookie data or an IP address, locate both profiles for correlation testing with extracted profile data. At the end of a session or browse period, user identifier 92 again compares the user profile generated during the session or browse period to the previously existing profile for the same key. This comparison determines whether the profiles are merged, if the correlation degree exceeds the threshold, or remain separate, if the correlation degree does not exceed the threshold. During a session or browse period, the extracted profile data is supplemented with existing profile data, if an existing profile was located and correlated to the extracted data, and provided to content selector 96. Content selector 96 uses the profile data to select viewing content such as banner advertising that may be of interest to the user and provides this content to CGI 70 or web server 60 for inclusion in the documents and other data returned to a client.

Figure 3:
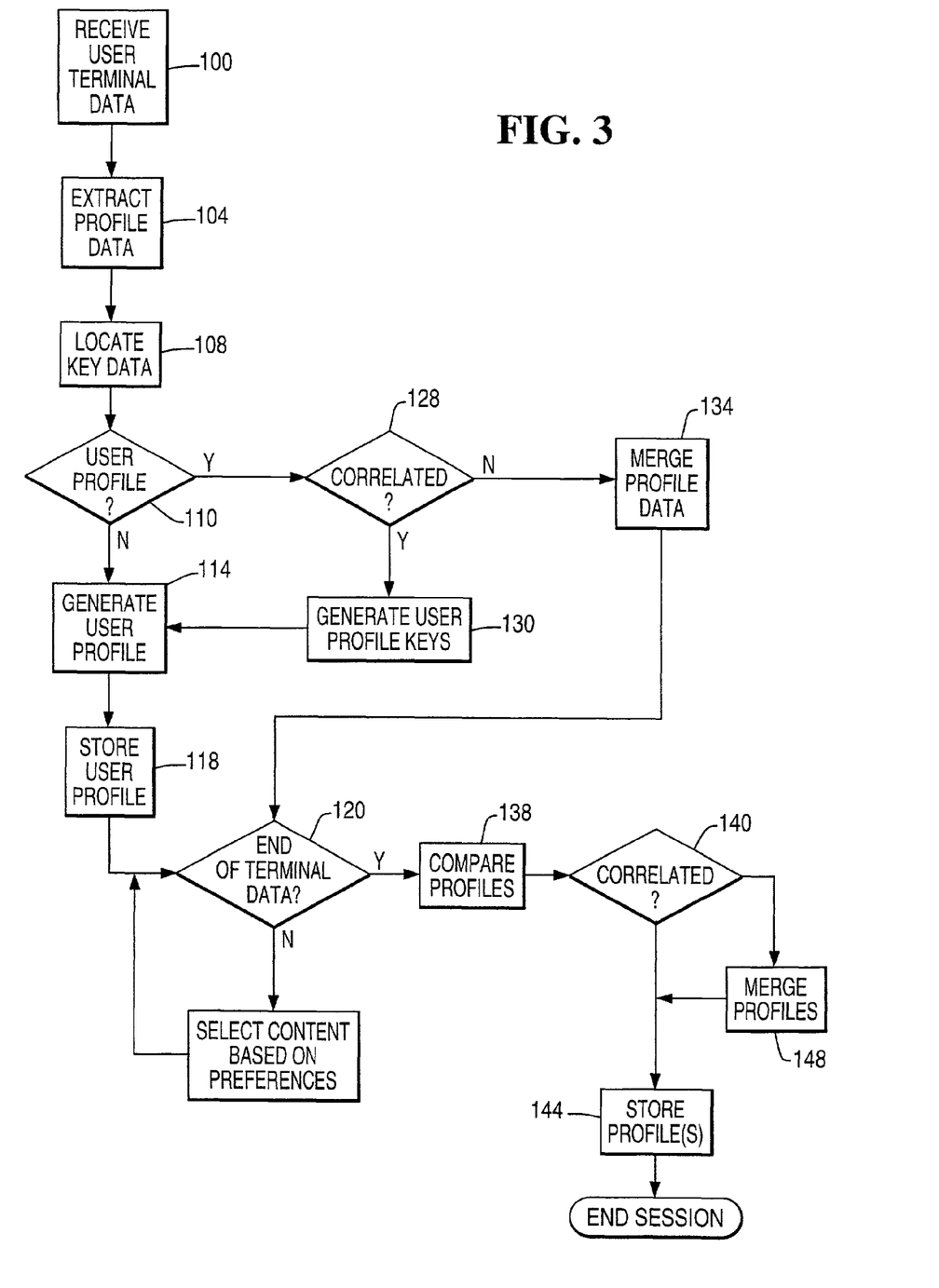
FIG. 3 is a flowchart of an exemplary method for differentiating users at a terminal of the system shown in FIG. 2.

An exemplary process performed by system 80 is shown in FIG. 3. The process begins by receiving user terminal activity data (block 100). Profile data is extracted from the data (block 104) and searched for key data (block 108). The key data is used to access a user profile database and determine whether a profile is already associated with the key in the database (block 110). If no profile exists for the key then a new client has been detected and a profile is generated from the extracted profile data (block 114). Additional data for the profile may be obtained from demographic and other similar databases if search data for such databases may be obtained from the extracted profile data. Once the profile is generated, the computer identification data, such as cookie data or IP address, is used as a key to store the generated profile in the database (block 118). The process continues to look for additional profile data to include in the generated profile (block 120). Additionally, the process uses the profile data to select content for inclusion in responses and other documents sent to the client (block 124).

If a user profile was found in the database that corresponded to the key then a degree of correlation is determined between the extracted profile data and the retrieved profile (block 128). This comparison may be based on the number of common resource identifiers, web sites, or personal data entries that are the same. Also, metadata associated with resources and web sites may be compared for common terms and a score of correlation determined for evaluating the correlation of the two profiles. The threshold may be a static number of common items, a percentage of items found in both profiles, or some other known statistical measurement of correlation that may be derived from such data. If the correlation score indicates the user profiles belong to different users, keys for two profiles associated with the computer identifier are generated (block 130) and the new profile is generated (block 114). The new profile is stored in association with its key while the previously existing profile is stored in association with its new key (block 118). The extracted profile data is used to update the new profile (block 120) and content is selected based on the user preferences (block 124). If the correlation score indicates the two profiles are likely for the same user, the extracted profile data is merged into the existing profile (block 134). The process continues by updating the profile with extracted profile data (block 120) and selecting content for the user based upon the profile data (block 124).

When a session or browse period ends and no further terminal activity data are available for profile data extraction, a profile comparison occurs (block 138). If no profile was generated then the comparison yields a correlation score (block 140) that permits the modified profile to be stored (block 144). If a new profile was generated and the comparison score indicates the profiles are for different users (block 140), both profiles are stored or verified as being stored in association with the different users associated with the same computer identifier (block 144). If the comparison indicates the newly generated profile should be part of the existing profile, the profiles are merged (148) and stored (144). In this manner, the process verifies the basis for the differentiation of users at the same computer identifier. This reduces the likelihood that different responses for a user associated with an existing profile result in the continued existence of a separate user profile. Additionally, the profile(s) may then be "scrubbed" of data that has not been supplemented or refreshed by subsequent activity. For example, data acquired for a gift purchase may not be supplemented with related preference data because the gift represents the recipient's preferences as perceived by the user and not the user's preferences. After making the gift purchase, the user is not likely to visit that site or similar ones thereafter. Such data may be detected and removed by searching for correlated with a subsequent time period such as three months. If no preference data corresponding or correlated to the preference data previously extracted are located, the previously extracted data are deleted from the corresponding profile history.

In operation, the system of the present invention is coupled to a web site, ISP provider, or a user's terminal. A system located at a web site, extracts profile data from a user's interaction with the site during a communication session with the site. User identification data such as cookie data or the like is used to determine whether a user profile exists and to retrieve it if it does. The extracted data are used to determine whether a different user is interacting with the site. If a difference is detected, a second user profile history is generated and associated with the terminal identifier associated with the user activity data from which profile data are being extracted. Otherwise, the existing user profile history is updated. At the end of the communication session, the profile history is evaluated for merger into the existing profile and scrubbed of preference data that has not been supplemented or refreshed recently.

A system located at an ISP provider, extracts profile data from user activity data with web sites during a browsing session through the ISP provider. User identification data such as cookie data or the like is used to determine whether a user profile exists and to retrieve it if it does. The extracted data are used to determine whether a different user is conducting the browsing session. If a difference is detected, a second user profile history is generated and associated with the terminal identifier associated with the user activity data from which profile data are being extracted. Otherwise, the existing user profile history is updated. At the end of the communication session, the profile history is evaluated for merger into the existing profile and scrubbed of preference data that has not been supplemented or refreshed recently.

A system located at a user's terminal, extracts profile data from user activity data during a browsing session. Terminal identification data such as manufacturer's identification number or the like is used to determine whether a user profile exists and to retrieve it if it does. The user profile may be stored at the terminal or at a third party site. The extracted data may be used at the terminal or third party site to determine whether a different user is using the terminal to conduct a browsing session. If a difference is detected, a second user profile history is generated and associated with the terminal identifier. One or more user profiles stored at the terminal may be transmitted to the third party site for the purpose of analyzing the preference data in the profile and selecting content for transmission to the terminal, either directly or through another server on the network. The site receiving the profile history may then signal the terminal to delete the preference data from the profile history to release storage space on the terminal, although a compressed or summary version of the history may be stored at the terminal to facilitate initial activity evaluation at the terminal. The existing user profile history may then be updated. At the end of the communication session, the profile history is evaluated for merger into an existing profile and scrubbed of preference data that has not been supplemented or refreshed recently.

The system and method of the present invention may also be used in a CATV system or other subscriber communication system. In the exemplary system of FIG. 4, CATV system 150 includes a head end 154, amplifying distribution hubs 158, tap points 160, and subscriber sites 164. A subscriber site 164 may have one or more terminals 168 that are coupled to a distribution line 170 though a splitter 174. Head end 154 provides content to subscriber sites 164 and the content may be obtained from servers, satellites, or other known content sources for CATV systems. The content in a typical CATV is provided over communication conduits such as coaxial cable, fiber cable, or a hybrid of both cable types. Amplifying hubs 158 are provided in the system to filter noise from the broadcast signal as it is transmitted through the system and to boost the power of the signal as it travels through the network. Tap points 160 provide the signal to a subscriber site and also permit the signal to travel to the next tap point. Splitter 174 couples more than one terminal to a tap point. In a CATV system, a terminal is typically a television set with a set top box. The set top box contains a microprocessor with program and data memory for controlling the interfacing of the broadcast signal to the television. The signal broadcast through the CATV system has a broadband spectrum that is divided into channels containing content. By tuning to a particular channel frequency, a terminal may receive the content provided through the corresponding channel unless the signal is scrambled. In that event, the processor of the set top box corrects the signal for display provided the conditions for signal correction are verified by the set top box. Increasingly, return channels are also provided in the communication spectrum of CATV systems so users may return data to head end 154 through system 150. Some systems may even support a return channel for each broadcast channel of a system 150.

Figure 4:
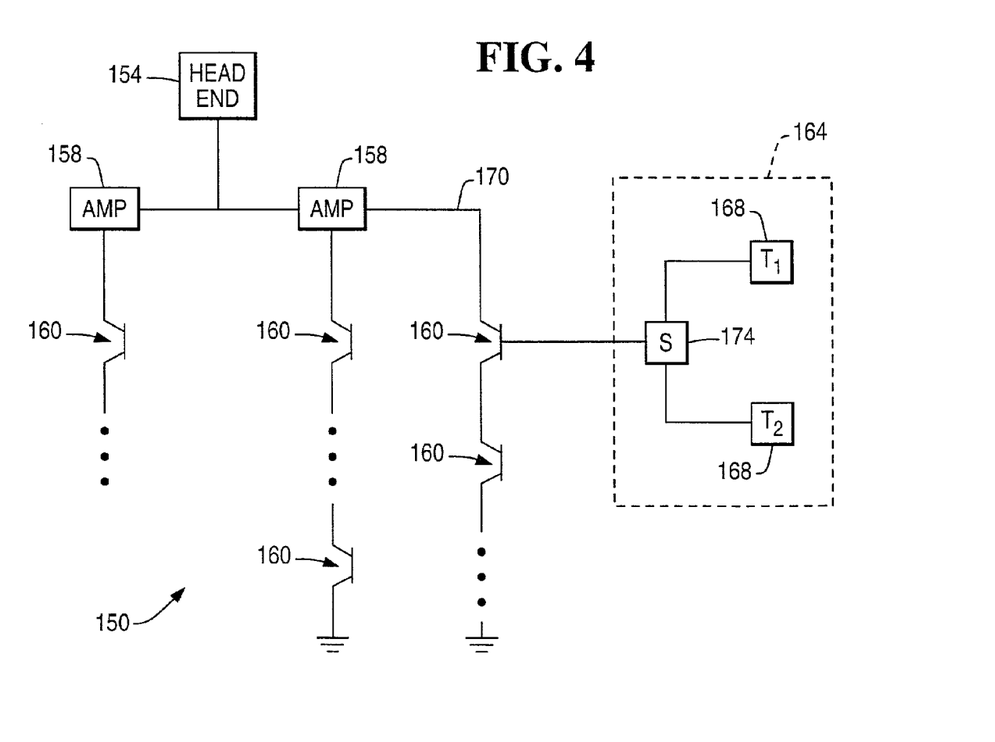
FIG. 4 is a diagram of a CATV network in which the present invention may be used.

The system and method of the present invention may be included at head end 154, hub 158, or a terminal 168. Activity data may include channel selection data, metadata regarding the content of the channel being received, set top box identification data, subscriber site data, and the like. This data may be used to generate different profiles for the terminals at a subscriber site. For example, a subscriber's house may have two televisions with one located in a family area and another located in the bedroom of the parents. With a system 80 located at a hub 158 or head end 154, one or more profiles may be generated for each television. The television in the family area may eventually generate a profile for identifying children preferences as they view the television at common times and repeat viewing patterns. The television in the parents' room may lead to the generation of a parent profile, a husband profile, and a wife profile. The generation of these various profiles arises from the similar content viewed by a group or individual on a repeated basis. Thus, the system and method of the present invention provides user identification at different televisions in the same subscriber site. With this data, different advertising content, for example, may be selected and sent on different channels for different televisions operating within a home at the same time. Accordingly, content for screen within screen (SWS) viewing for cartoon viewing on the family room television may be selected in accordance with a children profile while the SWS content for the pre-game show viewed in the master bedroom may be selected in accordance with the husband profile. In this manner, advertising and other content may be targeted because different profiles are developed for the same subscriber site.

In operation, a system of the present invention may be installed at the head end of a CATV system and the processors of the set top boxes programmed to return channel-being-viewed data. The set top box may also return data regarding a downloaded movie being viewed if the system permits movie downloading and time-shifted viewing. The system located at the head end extracts profile data from a content-being-viewed data during a viewing period at a terminal such as a television. Terminal identification data such as set top box or a manufacturer's number identification data or the like are used to determine whether a user profile exists and to retrieve it if it does. The extracted data are used to determine whether the content being viewed indicates a viewer different than the profile history associated with the terminal identification data is viewing the terminal. If a difference is detected, a second user profile history is generated and associated with the terminal identifier. Otherwise, the existing user profile history is updated. At the end of the viewing session, the profile history is evaluated for merger into the existing profile and scrubbed of preference data that has not been supplemented or refreshed recently.

While the present invention has been illustrated by a description of exemplary processes and system components, and while the various processes and components have been described in considerable detail, it is not the intention of the applicant to restrict or in any limit the scope of the appended claims to such detail. Additional advantages and modifications will also readily appear to those skilled in the art. For example, while the description above focuses on a client/server implementation, the system and method of the present invention may also be adapted to a peer-to-peer system as well. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A system for profiling different users having a common terminal identifier comprising:

memory for storing user profile histories, each user profile history being stored in association with a key;

a server for receiving user activity data from clients over a computer network;

a user activity data analyzer for receiving the user activity data from the server and for extracting profile data from the user activity data;

a user identifier for searching the user activity data for key data that identifies one of a user terminal and a user account and for determining whether the key data located in the user activity data corresponds to a key stored in the memory; and a user profile generator for generating a user profile history from the extracted profile data and a user identifier key from the key data in response to the key data corresponding to a key stored in the memory and the extracted profile data not corresponding to the user profile history stored in the memory in association with the key that corresponds to the key data, the generated user identifier key indicating the generated user profile history is associated with a user that is different than a user associated with the key stored in the memory.

2. The system of claim 1 wherein the user activity data is session data.

3. The system of claim 1 wherein the user activity data is browse period data.

4. The system of claim 1 wherein the extracted profile data includes a site identifier, a resource identifier, and a terminal identifier.

5. The system of claim 4 wherein the user profile generator generates the user profile history and the user identifier key in response to the key data corresponding to a key stored in the memory and to a low level of correlation existing between the site identifier and the resource identifier of the extracted profile data and site identifiers and resource identifiers in the user profile history stored in the memory in association with the key that corresponds to the key data.

6. The system of claim 5 wherein the extracted profile data includes metadata associated with the site identifier and the resource identifier.

7. The system of claim 1 wherein the user identifier identifies a user at a terminal identified by a computer identifier that generated the user activity data received by the server by determining which one of at least two user profile histories, each of which is stored in the memory in association with a key, each key being associated with the computer identifier that corresponds with the extracted profile data; and the system further includes:

an advertising selector for selecting an advertising file for transmission to the terminal, the selected advertising file corresponding to the identified user.

8. The system of claim 4 wherein the terminal identifier is a cookie.

9. The system of claim 4 wherein the terminal identifier is an Internet protocol (IP) address.

10. The system of claim 6 wherein the terminal identifier is a subscriber identifier.

11. The system of claim 10 wherein the subscriber identifier identifies a cable television network subscriber, the session data identifies a tuned channel, and the metadata identifies program content on the tuned channel.

12. The system of claim 11 wherein the user identifier identifies a user at a terminal identified by a terminal identifier that generated the user activity data received by the server by determining which one of at least two user profile histories, each of which is stored in the memory in association with a key, each key being associated with the terminal identifier, corresponds with the extracted profile data; and the system further includes:

an advertising selector for selecting an advertising file for transmission to the terminal, the selected advertising file corresponding to the identified user.

13. A method for profiling different users having a common terminal identifier comprising:

storing user profile histories in a memory, each user profile history being stored in the memory in association with a key;

receiving user activity data at a server from clients over a computer network;

receiving the user activity data from the server;

extracting profile data from the user activity data;

searching the user activity data for key data that identifies one of a user terminal and a user account;

determining whether the key data located in the user activity data corresponds to a key stored in the memory;

generating a user identifier key from the key data and a user profile history from the extracted profile data in response to the key data corresponding to a key stored in the memory and the extracted profile data failing to correlate to the user profile history stored in the memory in association with the key stored in the memory;

storing the generated user identifier key in the memory; and storing the generated user profile history in the memory in association with the generated user identifier key and the key to which the key data corresponded so the generated user profile history is associated with a user that is different than a user associated with the user profile history stored in association with the key stored in memory to which the key data corresponded, but both the generated user profile history and the user profile history stored in the memory are associated with the key that corresponded to the key data.

14. The method of claim 13 wherein the profile data is extracted from session data.

15. The method of claim 13 wherein the profile data is extracted from browse period data.

16. The method of claim 13, the determination that the key data corresponds to a key stored in the memory includes: comparing a site identifier and a resource identifier in the extracted profile data with site identifiers and resource identifiers in user profile histories stored in the memory.

17. The method of claim 16, the comparison of the site identifier and the resource identifier in the extracted profile data to site identifiers and resource identifiers in user profile histories further comprising:

detecting a low level of correspondence between the site identifier and the resource identifier of the extracted profile data and the site identifiers and resource identifiers in a user profile history stored in the memory.

18. The method of claim 16 wherein the profile data extraction extracts metadata associated with the site identifier and the resource identifier in the extracted profile data.

19. The method of claim 13 further comprising:

identifying a user at a terminal identified by a computer identifier that generated the user activity data received by the server by determining which one of at least two user profile histories, each of which is stored in the memory in association with a key, each key being associated with the computer identifier, corresponds with the extracted profile data; and selecting an advertising file for transmission to the terminal, the selected advertising file corresponding to the identified user.

20. The method of claim 16 wherein the comparison of site identifiers in the extracted profile data and the user profile histories stored in the memory compares cookies.

21. The method of claim 16 wherein the comparison of site identifiers in the extracted profile data and the user profile histories stored in the memory compares Internet protocol (IP) addresses.

22. The method of claim 18 wherein the profile data extraction extracts a subscriber identifier that identifies a subscriber site on a cable television network.

23. The method of claim 22 wherein the profile data extraction extracts a tuned channel identifier and metadata, the tuned channel identifier identifying a transmission channel to which a receiver is tuned at the identified subscriber site and the metadata identifies program content on the tuned channel.

24. The method of claim 23 further comprising:

identifying a user at the subscriber site identified by the subscriber identifier by determining which one of at least two user profile histories, each of which is stored in the memory in association with a key, each key being associated with the subscriber identifier for the subscriber site at which the user tuned the channel, corresponds with the extracted profile data; and selecting an advertising file for transmission to the subscriber site, the selected advertising file corresponding to the identified user.

\* \* \* \* \*